US010582158B2

(12) United States Patent
Biderman et al.

(10) Patent No.: US 10,582,158 B2
(45) Date of Patent: Mar. 3, 2020

(54) SYNCHRONIZATION OF MEDIA RENDERING IN HETEROGENEOUS NETWORKING ENVIRONMENTS

(71) Applicant: Apple Inc., Cupertino, CA (US)

(72) Inventors: David L. Biderman, San Jose, CA (US); Simon Ezriel Chaim Goldrei, San Jose, CA (US); Zhenheng Li, San Jose, CA (US); Roger N. Pantos, Cupertino, CA (US); Mohammed Z. Visharam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 15/435,882

(22) Filed: Feb. 17, 2017

(65) Prior Publication Data
US 2017/0289500 A1 Oct. 5, 2017

Related U.S. Application Data

(63) Continuation of application No. 14/871,879, filed on Sep. 30, 2015.

(51) Int. Cl.
H04N 7/15 (2006.01)
H04N 7/14 (2006.01)

(52) U.S. Cl.
CPC ............ H04N 7/15 (2013.01); H04N 7/147 (2013.01)

(58) Field of Classification Search
CPC ...... H04N 7/147; H04N 7/15; H04N 21/4302; G06F 3/165; G06F 3/17
USPC ................... 348/14.01–14.16; 370/259–271, 370/351–357; 700/94
See application file for complete search history.

(56) References Cited

U.S. PATENT DOCUMENTS 7,710,943 B2 5/2010 Seo et al.
8,385,250 B2 2/2013 Lee et al.
9,094,564 B2* 7/2015 Soldan .................. G06F 1/12
9,100,687 B2* 8/2015 Amidei ............. H04N 21/8547
(Continued)

FOREIGN PATENT DOCUMENTS

CN 101031085 A 9/2007
CN 101990101 A 3/2011
(Continued)

OTHER PUBLICATIONS

International Search Report and Written Opinion issued in International Patent Application No. PCT/US2016/049280, dated Oct. 28, 2016.
(Continued)

Primary Examiner — Hemant S Patel
(74) Attorney, Agent, or Firm — BakerHostetler

(57) ABSTRACT

Techniques are disclosed for synchronizing media rendering among a plurality of networked terminals. A first terminal may receive communication from another terminal that correlates a network time to a first portion of a media item to be rendered on the terminals. The terminals may identify, from the correlation of network time to the first portion of media and from a playback rate negotiated between the terminals, other portions of the media item to be rendered at other network times. The terminals each may render appropriate portions of the media item as network time progresses. The terminals also may exchange other data to alter playback modes during the course of a common rendering session.

29 Claims, 3 Drawing Sheets

(56) References Cited

U.S. PATENT DOCUMENTS

| | | | |
|---|---|---|---|
| 9,729,630 B2 | 8/2017 | Bradely et al. | |
| 2007/0250761 A1* | 10/2007 | Bradley | H04L 67/1095 715/203 |
| 2011/0196918 A1 | 8/2011 | Kkunigita et al. | |
| 2011/0218656 A1* | 9/2011 | Bishop | G06F 17/30017 700/94 |
| 2012/0236842 A1 | 9/2012 | De Foy et al. | |
| 2012/0284757 A1 | 11/2012 | Rajapakse | |
| 2013/0198298 A1* | 8/2013 | Li | H04N 21/41407 709/206 |
| 2014/0351874 A1 | 11/2014 | Yoo et al. | |
| 2014/0359681 A1 | 12/2014 | Amidei | |
| 2016/0134680 A1 | 5/2016 | Yamagishi et al. | |

FOREIGN PATENT DOCUMENTS

| | | |
|---|---|---|
| CN | 102959544 A | 3/2013 |
| CN | 103106679 A | 5/2013 |
| CN | 103890783 A | 6/2014 |
| JP | 2009-060512 A | 3/2009 |
| JP | 2009-290557 A | 12/2009 |
| JP | 2010-103995 A | 5/2010 |
| JP | 2013-162205 A | 8/2013 |
| JP | 2014-239278 A | 12/2014 |
| WO | WO 2009/047750 A2 | 4/2009 |
| WO | 2011/139929 A2 | 11/2011 |
| WO | 2014/194236 A2 | 12/2014 |

OTHER PUBLICATIONS

U.S. Appl. No. 14/548,032, filed Nov. 19, 2014.
"Timing and Synchronization for Time-Sensitive Applications in Bridged Local Area Networks," IEEE Std 802.1AS TM-2011, IEEE Standard for Local and Metropolitan Area Networks, IEEE Computer Society, Mar. 30, 2011.
"How Does it Work?", NTP.org, n.d., Retrieved May 4, 2015 from http://www.ntp.org/ntpfaq/NTP-s-algo.htm, pp. 1-9.
Mohl, Dirk S., "IEEE 1588—Precise Time Synchronization as the Basis for Real Time Applications in Automation," L-Com Global Connectivity, n.d., 8 pages, Nov. 2002.
International Patent Application No. PCT/US2016/049280; Int'l Preliminary Report on Patentability; dated Apr. 12, 2018; 7 pages.

* cited by examiner

200

300

SYNCHRONIZATION OF MEDIA RENDERING IN HETEROGENEOUS NETWORKING ENVIRONMENTS

CROSS-REFERENCE TO RELATED APPLICATIONS

This application is a continuation of and claims priority to U.S. patent application Ser. No. 14/871,879, filed Sep. 30, 2015 and entitled "Synchronization of Media Rendering in Heterogeneous Networking Environments," which was filed concurrently with U.S. Patent Applications entitled "Music Everywhere" (U.S. Ser. No. 14/871,842), "Earbud Sharing" (U.S. Ser. No. 14/871,839), "Clock Synchronization Techniques Including Modification of Sample Rate Conversion" (U.S. 62/235,407), and "Shared Content Presentation with Integrated Messaging" (U.S. Ser. No. 14/871,939), the entireties of which are incorporated herein.

BACKGROUND

The present disclosure relates to media rendering applications for networked devices and, in particular, for techniques to synchronize media rendering to mimic broadcast delivery operations.

Modern communication networks support delivery of a host of different types of data, including video data. In many applications, particularly where video is consumed by an audience at a single display device, skews in network delivery and rendering of the video does not adversely affect the viewing experience. Consider an example where three separate audiences reviewing a common media item at three separate locations. Even where the audiences are viewing a "live" video feed, the audiences' viewing experiences may not be adversely affected if rendering of video for audience 1 occurs one second before rendering of the same video for audience 2 and three seconds before rendering of the video for audience 3.

If the three audiences, however, are attempting to review the video in concert with each other and are in communication with each other (for example, by an audio conference), such skews may affect the viewing experience. Commentary by one audience member may be difficult to understand if, for example, the commentary relates to video that has not yet been presented to other audience members at other locations or if the commentary relates to video that was rendered so long ago that audience members at the other locations have difficulty remembering its content.

Media delivery protocols often require rendering terminals to make requests of media servers for media content that will be rendered. A single media item may be segmented into a variety of delivery units ("segments") that are individually requested by a terminal, downloaded and buffered for decode and rendering. When two terminals or more render a common media item, each terminal requests segments from a media server independently of whatever requests are made by other terminals. There is no known technique to synchronize adequately media rendering operations in such systems.

DETAILED DESCRIPTION

Embodiments of the present disclosure provide techniques for synchronizing media rendering among a plurality of networked terminals. A first terminal may receive communication from another terminal that correlates a network time to a first portion of a media item to be rendered on the terminals. The terminals may identify, from the correlation of network time to the first portion of media and from a playback rate negotiated between the terminals, other portions of the media item to be rendered at other network times. The terminals each may render appropriate portions of the media item as network time progresses. The terminals also may exchange other data to alter playback modes during the course of a common rendering session.

Figure 1:
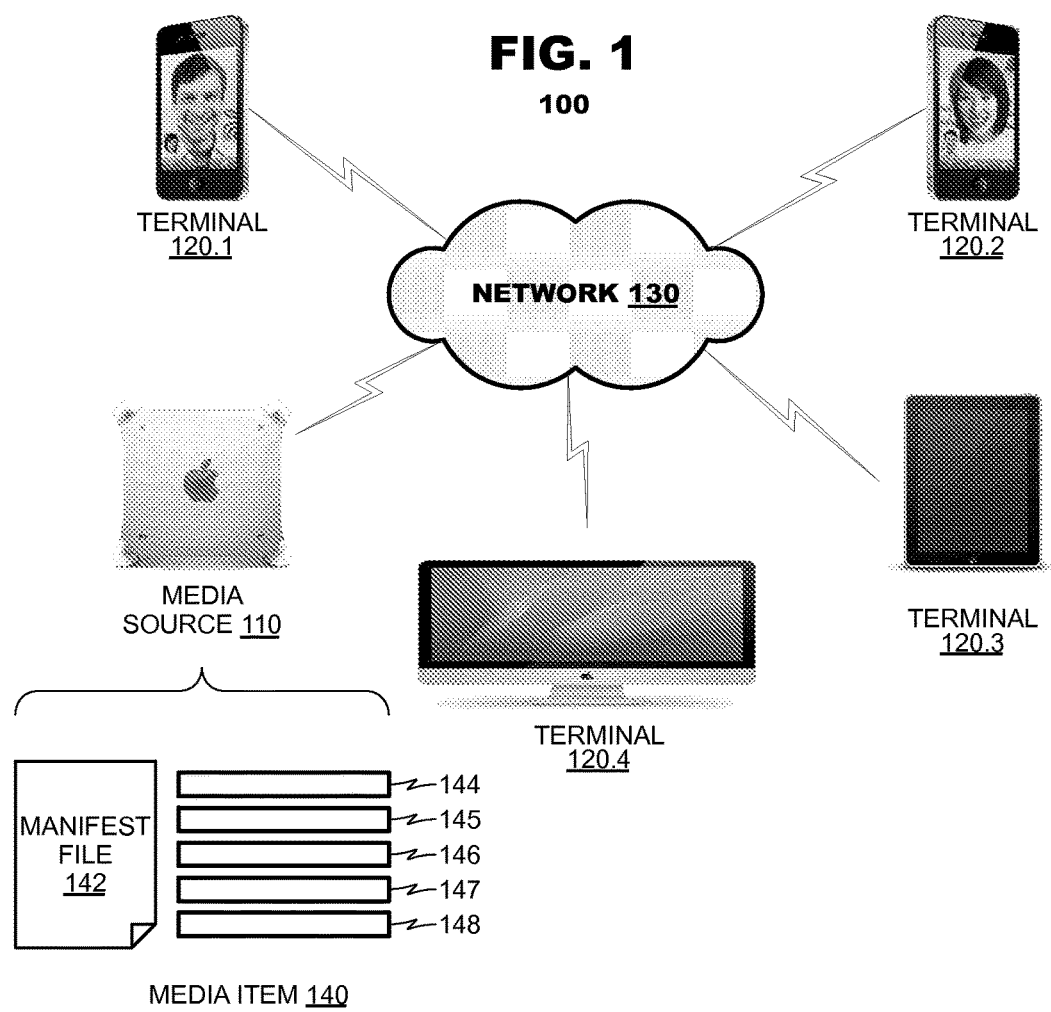
FIG. 1 is a simplified block diagram of a media distribution system suitable for use with various embodiments of the present disclosure.

FIG. 1 is a simplified block diagram of a media distribution system 100 suitable for use with various embodiments of the present disclosure. The system 100 may include a media source 110 and one or more client terminals 120.1-120.4 (referenced collectively as 120) provided in mutual communication by a network 130. The media source 110 may store various media items 140 that can be downloaded and rendered by the terminals 120. The network 130 represents a communication fabric through which the media items 140 may be delivered from the media source 110 to the terminal(s) 120.

FIG. 1 illustrates exemplary components of a media item 140 according to an embodiment of the present disclosure. The media item 140 may include a manifest file 142 that contains information describing other components 144-148 of the media item 140. A single media item 140 that represents audio/visual content typically will include several instances of coded video, each of which represents the media item's visual content but coded at different data rates. For example, a single media item 140 may be presented by a 5 Mbps stream 144, a 2 Mbps stream 145 and a 500 Kbps stream 146. The media item also may include streams 147-148 for different audio tracks, for example, an English track 147, a Spanish track 148 and tracks (not shown) in other languages (Hebrew, Chinese, etc.). It is permissible also to include tracks for other purposes, for example, for close captioning and the like. These streams 144-148 typically are organized into individually packaged units (called "segments") for download. The manifest file 142 may store data identifying the different streams, their properties and providing network identifiers where the segments for each track may be retrieved.

During operation, a given terminal 120.1 likely will not consume all the streams 144-148 that are available for a media item 140. Instead, the terminal 120.1 likely will identify the audio and video streams (say, streams 145 and 147) that are appropriate for the terminal's rendering environment. Another terminal 120.2 that operates in a different environment may select different streams (say, streams 144 and 148) for download and display. The different environments may be influenced by resource differences between the devices 120.1-120.4, for example, the resolutions of their respective displays and differences among processing resources available for stream decode, and also may be influenced by differences in bandwidth that may be provided by the network 130 to each terminal 120.1, 120.2, 120.3, and 120.4.

FIG. 1 illustrates a simplified architecture of a media item 140. In practice, a manifest file 142 may be represented by an array of files, each of which provides information about respective portions of the media item.

As illustrated in FIG. 1, the terminals 120 are illustrated as smart phones 120.1, 120.2, tablet computers 120.3 and displays 120.4 but the principles of the present disclosure are not so limited. Embodiments of the present disclosure find application with personal computers (both desktop and laptop computers), computer servers, set top boxes, media players, and/or gaming platforms. The network 130 represents any number of networks that convey coded video data between the media source 110 and the terminals 120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

Figure 2:
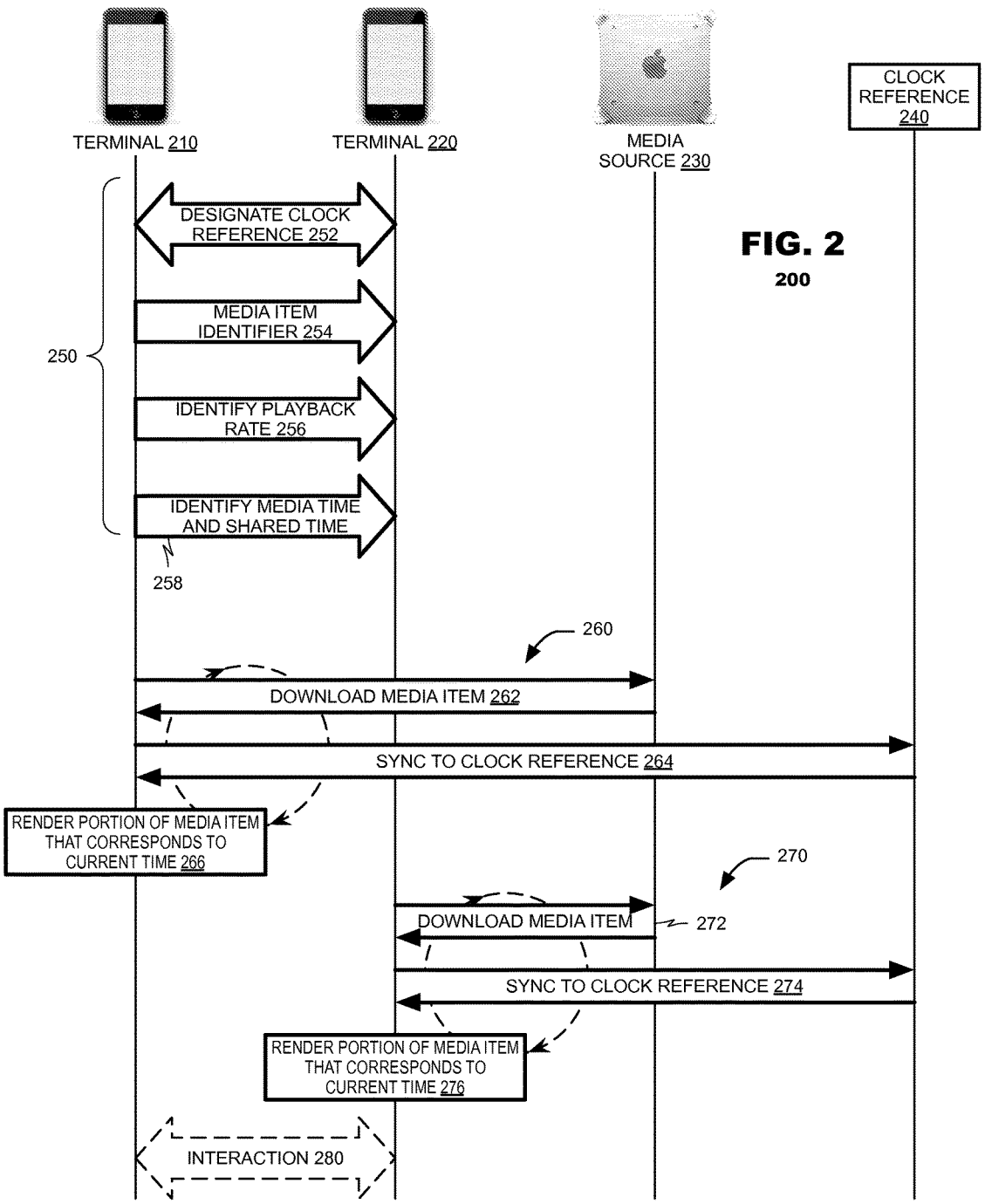
FIG. 2 illustrates a process to synchronize media rendering among terminals according to an embodiment of the present disclosure.

FIG. 2 illustrates a process 200 to synchronize media rendering among terminals according to an embodiment of the present disclosure. FIG. 2 illustrates a pair of terminals 210, 220, a media source 230 and a clock reference 240. A synchronized rendering session may begin with an initialization phase 250 that establishes the session between the terminals 210, 220. The initialization phase 250 may include a first communication flow 252 that is exchanged between the terminals 210, 220 in which the terminals 210, 220 designate a clock reference 240 to be used during the session. As part of the initialization phase 250, one of the terminals 210 (designated a "primary" terminal) may transmit messages to the other terminal 220 (the "secondary" terminal) identifying a media item to be rendered (message 254), identifying a playback rate to be used during the session (message 256) and identifying a shared network time that corresponds to a media time (message 258). The secondary terminal 220 may use the media item identifier 254 to identify a network location of the media time to be rendered synchronously. The secondary terminal 220 may make requests for the media item from the media source 230 independently of any requests made by the primary terminal 210. The secondary terminal 220 also may select streams from the media item that are appropriate for the secondary terminal 220; the terminal's selection may be made independently of selections made by the primary terminal 210.

The secondary terminal 220 may use the media time and shared time identifiers (message 258) to correlate a point in the media item to a network time. This correlation, used in conjunction with the playback rate, permits the secondary terminal 220 to identify which elements of the media item are to be rendered in the future.

Once the initialization phase 250 concludes, the terminals 210, 220 may enter respective rendering phases 260, 270 of the session. During the rendering phases 260, 270, each terminal's operations may occur independently of the other but the terminals 210, 220 nevertheless render video that is synchronized. Each terminal 210, 220 may download selected streams of the media item from the media source (message flows 262, 272). Each terminal 210, 220 may synchronize its rendering operation to the clock reference (message flows 264, 274). Each terminal 210, 220 may render a portion of the media item locally by determining, based on the playback rate and the correlation identified in the initialization phase 250, which portion of the media item should be rendered at a current "time" at each terminal (boxes 266, 276). These operations may occur recursively throughout the video session until a predetermined stopping condition is reached, such as the rendering session reaches an end of the media item or a user operation causes ordinary playback to be suspended.

Embodiments of the present disclosure contemplate that the video rendering session may occur in parallel with other interactions 280 between the terminals 210, 200. For example, the terminals 210, 220 may support an audio or audio/visual conference between them, which allows viewers at each terminal to comment on the media item that is being rendered. Alternatively, the interactions 280 may take other forms, such as instant messaging sessions, chat applications, tweeting, social networking feeds and the like. The terminals 210, 220 may support joint document-authoring application that allows viewers at each terminal to develop notes or annotations of the media item.

Although FIG. 2 illustrates a rendering session between only two terminals 210, 220, the principles of the present disclosure are not so limited. In practice, a rendering session may include an arbitrarily-selected number (N) of terminals. In such applications, the communication flows 252 may be shared among the N terminals. The primary terminal 210 may send messages 254-258 to the other N−1 secondary terminals to complete the initialization phase. Thereafter, the terminals may conduct their rendering phases 260, 270 in parallel with each other.

The clock reference 240 may be obtained by any of a variety of techniques. For example, several networking protocols define clock references for network elements, including the Network Time Protocol (NTP), IEEE 1588 and IEEE 802.1as standards. The terminals 210, 220 may rely on timing references provided by any of these protocols for use during rendering. When terminals designate clock references (message 252) for use in the rendering session, the terminals 210, 220 may designate an appropriate network element that supplies such timing references. The terminals 210, 220 each may refer to the clock reference 240 to develop a correlation between each terminal's local operating time, which may vary from terminal to terminal (e.g., in boxes 266, 276), to a network time defined by the clock reference 240 that is used.

In practice, individual terminals 210, 220 may operate according to local clocks that may exhibit drift with respect to these clock sources. For example, a given terminal's clock may cause rendering to occur at a rate that is 0.01% faster than rendering at other devices. A terminal may periodically resynchronize its operations to the clock reference 240 to adjust its operation. Additionally, a terminal 220 may track clock drift errors over the course of a rendering session and, if errors are determined to be material (e.g., over a predetermined threshold), the terminal 220 may calculate a local playback rate that compensates for such clock drift (e.g., to null out the 0.01% error in the foregoing example).

FIG. 2 illustrates communication flow and operations that may occur when two terminals render video at a constant playback rate. Embodiments of the present disclosure also provide communication flows to support rendering modes that differ from the constant playback example shown in FIG. 2. They include:

Pause Playback: In this mode, the terminals 210, 220 each may pause rendering of the media item at a predetermined point in the media item's rendering timeline. To support this mode, a terminal (say, terminal 220), at which a pause command was entered, may transmit a message to the other terminal(s) 210 of the session identifying that a pause command has been entered and identifying a media time at which the pause operation takes effect. Each terminal 210, 220 in the session may pause rendering at the media time identified in the pause message.

Resume Playback: A terminal may resume ordinary playback, releasing a previously imposed pause operation. To support this mode, an initiating terminal 210 (which need not be the same terminal that engaged the pause operation) may transmit a message that identifies that the pause has been released and identifying a network time reference at which the release should take effect. Based on this message, each receiving terminal may generate a new correlation between its network time and the media item's timeline and may resume rendering using the new correlation.

Scan Playback: In this mode, the terminals 210, 220 each should alter a rate of playback from the default rate identified in the playback rate message 256 to an alternate rate. Playback rates may be increased from ordinary rendering rates (e.g., 2-, 4-, 8- or 16-times a default rate) or they may be decreased from the ordinary rates (e.g., ½- or ¼-times a default rate). Moreover, playback rates may be negative values to allow scanning in a reverse direction from ordinary playback. To support such playback modes, an initiating terminal may transmit a message to the other terminal 210 identifying that the scan mode is being entered, identifying a new playback rate and identifying a media time at which the scan mode takes effect. Each terminal 210, 220 may define a new correlation between its own current time and the media item's timeline using the information provided in the new message.

Seek Playback: In this mode, the terminals 210, 220 should jump from a first position in the media item's timeline to a second position. To support a seek mode, an initiating terminal may transmit a message to the other terminal 210 identifying that the seek mode has been entered, identifying a new position in the media item to which playback should jump and a network time at which rendering at the new position should begin. Each terminal 210, 220 may define a new correlation between its own current time and the media item's timeline using the information provided in the new message.

Scrub Playback: In this mode, a user at a first terminal 210 scrolls across a media item's timeline using a user interface control, such as a slider. At the first terminal, the scroll operation advances through the timeline at a rate determined by the user, which may be erratic. The first terminal 210 may display frames from the timeline at a periodic rate, which may selected from the media item based on a position of the scroll operation when display of a new frame is required.

During the scrub operation, a first terminal 210 may send a message to other terminal(s) 220 indicating that a scrub has been initiated and identifying a network time when the scrub operation began. The other terminals 220 may respond as if a pause message was received, pausing playback at a frame that was to be rendered at the indicated network time.

When the scrub operation is completed, rendering will resume at the first terminal 210 at a location within the media time that is identified by the interface control. The first terminal 210 may send another message to the other terminals 220 identifying a portion of the media item where rendering is to resume and identifying a network time at which rendering should begin. The other terminals 220 may respond as if a seek message was received and may jump to the identified location and begin rendering at the identified network time.

Optionally, while the scrub operation is underway, the first terminal 210 may send additional messages to the other terminals 220 identifying frames from the media item that were displayed at the first terminal 210 during progression of the scrub operation and identifying network times when those identified frames were displayed. In response, the other terminals 220 may display the identified frames at the network times. Transmission of such messages may contribute to loading at the terminals 210 and 220 and, therefore, such terminals may transmit or process these additional messages on a best effort basis.

Embodiments of the present disclosure also permit these messages to be cascaded with one other to provide additional functionality. For example, terminals 210, 220 may mimic changing channels of ordinary television programming by transmitting a pause message that terminates rendering of a first media item synchronously on the terminals 210, 220 then re-engaging an initialization phase 250 to begin rendering of a new media item synchronously on the terminals 210, 220.

The synchronized rendering techniques of the present disclosure find application in a variety of use cases. In one example, discussed above, members of a common social group may view a media item while engaged in a supplementary conference between terminals 210, 220. Thus, as viewers offer commentary or other reaction to the media item, their commentary likely will be meaningful to the other viewers who will be observing the same portion of the media item synchronously.

In another use case, viewers may be collected in a common viewing area, such as in front of a common large display. Some viewers may find it easier to watch the media item using a language that is different from the language that is being output by the common display. In this scenario, select viewers may engage a supplementary device (such as a personal media player or smart phone) that is synchronized to the main display but outputs alternate language audio via personal headphones. Selection of alternate audio tracks also may be supported in other viewing environments, such as the social group use case described above.

Similarly, in another community-viewing environment, viewers may watch a media item that is output on a community display device. Ambient viewing conditions (e.g., noise or the display is muted) may prevent the audio from being heard by certain listeners. In this scenario, select viewers may engage a supplementary device that is synchronized to the main display but outputs audio via personal headphones.

In a further community-viewing environment, a common media item may be rendered on a plurality of displays that are located in proximity to each other. In such environments, non-synchronized rendering may be highly visible to viewers, particularly as a common set of scene changes appear at different times on different displays. Using the synchronization techniques of the present disclosure, the displays in the common viewing area may synchronize rendering of the media item, which may minimize skew between rendering of media items across the displays.

The synchronization techniques also may find application in use cases where viewers can select different video streams for delivery on different displays in a common viewing area. For example, a media item that represents concert footage may have different video streams that are directed to different performers at the concert. A first video stream may include video of a lead singer, a second video stream may include video of a guitarist and a third video stream may include video of a drummer. In another example involving a sports event, different video streams may focus on different performers at the event. Audience members may synchronize personal media players to the main display and select one of these alternative video streams for rendering. In this manner, rendering of the alternative video stream at the personal media device may be synchronized to rendering the main display.

The synchronization techniques may find application in a video conferencing application where the media item is live-generated video. In such an embodiment, a remote participant may view the media item on a personal device (e.g., a smart phone or tablet computer) while a main display renders the video file on another device. In a videoconference involving three or more video participants (each of which generates its own media item), operators may control local rendering of the media items in a manner that differs from a default rendering scheme that may apply to other terminals. For example, an operator may choose a rendering scheme in which all media items are displayed in respective windows at the terminal and windows of a person currently speaking is rendered in a larger size than non-speaking participants. A default rendering scheme may not apply such enhancements and, instead, might render all media items in equally-sized windows, regardless of activity (e.g., speaking vs. non-speaking) that occurs in such media items.

The foregoing discussion has presented a networking environment in which each terminal downloads a media item from a common media source 230. The principles of the present disclosure find application in environments where several media sources (not shown) are present at a network that store redundant copies of the media item. Thus, a first terminal 210 may download the media item from a first media source 230 and a second terminal 220 may download the media item from another media source (not shown).

The principles of the present disclosure also find application in networking environments where one terminal 210 furnishes the media item (or portions thereof) to another terminal 220. In this embodiment, the first terminal 210 may download portions of the media item and store those portions in local storage. Alternatively, the first terminal 210 may author the media item by, for example, capturing video data by a local imaging system. In either case, the first terminal 210 also may communicate with the second terminal 220 to identify the portion(s) of the media item that it stores. In this circumstance, the terminal 220 has discretion to determine which entity, either the terminal 210 or the media source 230, it will request to furnish those portions of the media item. The second terminal 220 may estimate network loading conditions and other resource constraints when selecting the entity to which it will issue its requests for media items.

Further, although FIG. 2 illustrates that each terminal 210, 220 downloads the media items only after completion of session initialization, the principles of the present disclosure are not so limited. Embodiments of the present disclosure permit a terminal 210 (or all terminals) to download a media item in its entirety before initiating a synchronized rendering session with another terminal 220. In this case, the terminal(s) 210 that pre-store the media item need only synchronize rendering as described above.

The foregoing discussion has described an implementation in which a first terminal 210 is designated as a primary terminal and other terminal(s) are designated as secondary terminals. In an embodiment, the roles of these terminals may change during a common session. For example, a first terminal 210 may initiate a session as a primary terminal with other terminal(s) taking the role of secondary terminals. If, for some reason, a user at the first terminal 210 disengages from the session, then another terminal (say terminal 220) may assume the role of a primary terminal for a subsequent portion of the session. The role of primary terminal also may be changed by express user command entered via a user interface control that supports the session.

Additionally, although not illustrated in FIG. 2, other terminals (not shown) may join a session already in progress. When a new terminal joins a session, a terminal, either a primary terminal or one of the secondary terminals, may transmit messages, similar to messages 252-258, to the new terminal identifying the clock reference, media item, playback rate and correlation between media time and playback time. Thereafter, the new terminal may sync to playback of the other terminals and begin rendering of the media item.

Figure 3:
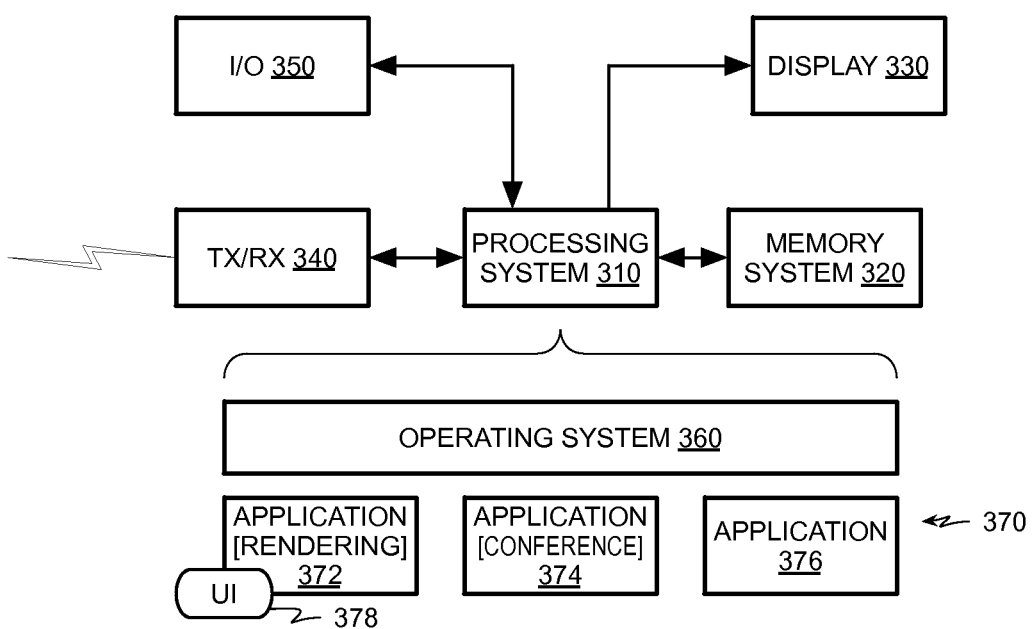
FIG. 3 is a functional block diagram of a terminal 300 according to an embodiment of the present disclosure.

FIG. 3 is a functional block diagram of a terminal 300 according to an embodiment of the present disclosure. The terminal 300 may include a processing system 310, memory system 320, display 330, transceiver (TX/RX) 340 and input/output (I/O) units 350.

The processing system 310 may control operation of the terminal 300 by causing the terminal 300 to interact with other entities, such as those illustrated in FIG. 2, to synchronize rendering. The memory system 320 may store instructions that the processing system 310 may execute and also may store application data (not shown) generated therefrom. The architecture of the processing system 310 may vary from terminal to terminal. Typically, the processing system 310 will include a central processing unit; it also may include graphics processors, digital signal processors and application specific integrated circuits (not shown) as may be suitable for individual application needs. The architecture of the memory system 320 also may vary from terminal to terminal. Typically, the memory system 320 will include one or more electrical, optical and/or magnetic storage devices (also not shown). The memory system 320 may be distributed throughout the processing system. For example, the memory system may include a cache memory provided on a common integrated circuit with a central processor of the processing system 310. The memory system 320 also may include a random access main memory coupled to the processing system 310 via a memory controller and it also may include non-volatile memory device(s) for long term storage The processing system 310 may execute a variety of programs during operation, including an operating system 360 and one or more application programs 370. For example, as illustrated in FIG. 3, the terminal 300 may execute a media rendering application 372, a conferencing application 374, along with possibly other applications. The media rendering application 372 may manage download, decoding and synchronized display of media items as described in the foregoing discussion. The conferencing application 374 may support conferencing exchange between the terminal 300 and another terminal (not shown) as discussed.

The rendering application 372 may define a set of user interface controls 378 for management of the application. Thus, user interface controls may vary according to the rendering use case for which the terminal 300 is applied. For example, default UI controls 378 may allow an operator to perform the pause, resume scan, seek and scrub operations described hereinabove. In some applications, however, it may be advantageous to deny applications to these controls.

For example, in an environment (for example, a restaurant or health club) in which multiple displays are displaying synchronized content for viewing by a large audience, it may be advantageous to deny individual users the ability to control media rendering, for example, by pausing or skipping content.

The foregoing discussion has described operation of the embodiments of the present invention in the context of terminals that include various components. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones, set top boxes, gaming platforms, portable media players and/or computer servers. Such computer programs typically are stored in physical storage media such as electronic-, magnetic- and/or optically-based storage devices, where they are read to a processor under control of an operating system and executed. And, of course, these components may be provided as hybrid systems that distribute functionality across dedicated hardware components and programmed general-purpose processors, as desired.

Moreover, although the foregoing discussion described a media item 140 (FIG. 1) in the context of a manifest file and different streams, the principles of the present disclosure apply to media items with different architectures. For example, a media item may have an architecture of a flat file in which all media content and metadata descriptions of timelines are provided in a single downloadable file. Further, the media item need not be a video file per se; the principles of the present disclosure apply to media items that represent audio-only content, gaming content and the like. Thus, the media items would be rendered through media sink devices, such as displays and/or speakers, that are appropriate for the media items' character.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method for synchronizing media rendering among terminals, comprising, at a first terminal:
   responsive to communication received from a second terminal including a synchronized rendering session and including a correlation between a network time of a remote network clock and a portion of a first version of a media item to be rendered by the second terminal:
   retrieving content of the media item from a network location,
   identifying, from the correlation and from a playback rate received in communication from the second terminal, a portion of a second version of the media item to be rendered at the first terminal and a time at which the portion of the second version is to be rendered, and
   rendering the portion of the second version of the media item at the time at which the portion of the second version is to be rendered.

2. The method of claim 1, wherein the identifying includes correlating the network time to a current time at the first terminal.

3. The method of claim 1, further comprising receiving an identification of the media item from the second terminal.

4. The method of claim 1, further comprising negotiating an identification of a source of the network time with the second terminal.

5. The method of claim 1, comprising, as a current time progresses throughout the rendering session, repeating the identifying and rendering until a stopping condition occurs.

6. The method of claim 5, wherein the stopping condition occurs when rendering reaches an end of the media item.

7. The method of claim 5, wherein the stopping condition is a new communication identifying an alternate rendering mode.

8. The method of claim 7, wherein the alternate rendering mode is a pause operation, the method thereafter comprising pausing rendering at a location of the media item identified in the new communication.

9. The method of claim 7, wherein the alternate rendering mode is a scan operation, the method thereafter comprising rendering the media item at an alternate playback rate identified in the new communication, beginning at a position in the media item identified by the new communication.

10. The method of claim 7, wherein the alternate rendering mode is a seek operation, the method thereafter comprising, when the rendering reaches a first position in the media item identified in the new communication, rendering the media item starting at a second position in the media item using a new correlation between the network time and the media item.

11. The method of claim 7, wherein the first terminal transmits the new communication to the second terminal.

12. The method of claim 7, wherein the first terminal receives the new communication from the second terminal.

13. A method for synchronizing media rendering among terminals, comprising, at a first terminal:
   transmitting a communication to an other terminal initializing a synchronized rendering session, the communication containing indicators correlating a network time to a portion of a first version of a media item to be rendered and a playback rate,
   retrieving content of the media item from a network location,
   identifying, from the correlation of network time to the portion of the first version and the playback rate, a portion of a second version of the media item to be rendered at the first terminal and a time at which the portion of the second version is to be rendered, and
   rendering the portion of the second version of the media item at the time at which the second portion is to be rendered.

14. The method of claim 13, wherein the identifying includes correlating the network time to a current time at the first terminal.

15. The method of claim 13, further comprising receiving an identification of the media item from the other terminal.

16. The method of claim 13, further comprising negotiating an identification of a source of the network time with the other terminal.

17. The method of claim 13, further comprising, as a current time progresses throughout the rendering session, repeating the identifying and rendering until a stopping condition occurs.

18. The method of claim 17, further comprising, repeating the identifying and rendering until the rendering reaches an end of the media item.

19. The method of claim 17, further comprising, when a new communication identifies a pause operation, pausing rendering at a location of the media item identified in the new communication.

20. The method of claim 17, further comprising, when a new communication identifies a scan operation:
  rendering the media item at an alternate playback rate identified in the new communication beginning at a position in the media item identified by the new communication.

21. The method of claim 17, further comprising, when a new communication identifies a seek operation:
  repeating the identifying and rendering until the rendering reaches a first position in the media item identified in the new communication, and
  thereafter, rendering the media item starting at a second position in the media item using a new correlation between the network time and the media item.

22. A terminal, comprising:
  a transceiver connected to a network,
  a media sink device,
  a processing system to execute program instructions that causes:
    the transceiver to download from a network resource a media item to be rendered,
    the transceiver to receive indicators from another terminal correlating a first network time to a portion of a first version of the media item,
    the media sink device to render, at a current network time, a portion of a second version of the media item correlated to the current network time as determined by the correlated first network time and the portion of the first version and by a playback rate.

23. The terminal of claim 22, wherein the media item is identified in communication between the terminal and the other terminal.

24. The terminal of claim 22, wherein identification of a source of the first network time is negotiated between the terminals.

25. A terminal, comprising:
  a transceiver connected to a network,
  a media sink device,
  a processing system to execute program instructions that causes:
    the transceiver to download from a network resource a media item to be rendered,
    at a current network time, identify, from a correlation of a network time to a portion of a first version of the media item and a playback rate for rendering, a portion of a second version of the media item to be rendered, and
    the media sink device to render the portion of the second version of the media item correlated to the current network time.

26. Computer readable storage device storing instructions that, when executed by a processing device, causes the processing device to:
  responsive to a communication received from an other device of a synchronized rendering session including a correlation from a network time to a portion of a first version of a media item to be rendered,
  retrieve content of the media item from a network location,
  identify, from the correlation and from a playback rate received in communication from the other device, a portion of a second version of the media item to be rendered and a time at which the portion of the second version is to be rendered, and
  render the portion of the second version of the media item at the time for rendering the second portion.

27. Computer readable storage device storing instructions that, when executed by a processing device, causes the processing device to:
  transmit a communication to another device initializing a synchronized rendering session, the communication containing indicators correlating a network time to a portion of a first version of a media item to be rendered and a playback rate,
  retrieve content of the media item from a network location,
  identify, from the correlation of network time to the portion of the first version and the playback rate, a portion of a second version of the media item to be rendered and a time at which the portion of the second version is to be rendered, and
  render the portion of the second version of the media item at the time for rendering the portion of the second version.

28. A method for synchronizing media rendering among terminals, comprising, at a first terminal:
  responsive to a communication received from a second terminal of a synchronized rendering session that renders a first media item, correlating a network time to a portion of the first media item,
  retrieving content of the media item from a network location,
  identifying, from the correlation of network time and from a playback rate received in the communication from the second terminal, a first portion of a second media item, different from the first media item, and a time at which the first portion of the second media item is to be rendered, and
  rendering the first portion of the second media item at the time at which the first portion of the second media item is to be rendered.

29. The method of claim 1, wherein the network time correlated to the portion of the first version of the media item is a past time as compared to a current time of the first terminal, and the identified time of the portion of the second version of the media item is a future time.

* * * * *